United States Patent
Miyamura et al.

(10) Patent No.: US 8,561,677 B2
(45) Date of Patent: Oct. 22, 2013

(54) COOLING/HEATING PANEL WITH HOLDING DEVICE

(75) Inventors: Masashi Miyamura, Kurobe (JP); Hiroshi Yamagishi, Kurobe (JP); Katsumasa Kanai, Kurobe (JP)

(73) Assignee: Toyox Co., Ltd., Toyama (JP)

( * ) Notice: Subject to any disclaimer, the term of this patent is extended or adjusted under 35 U.S.C. 154(b) by 1004 days.

(21) Appl. No.: 12/595,854

(22) PCT Filed: Apr. 14, 2008

(86) PCT No.: PCT/JP2008/057268
§ 371 (c)(1),
(2), (4) Date: Oct. 14, 2009

(87) PCT Pub. No.: WO2008/133079
PCT Pub. Date: Nov. 6, 2008

(65) Prior Publication Data
US 2010/0126707 A1    May 27, 2010

(30) Foreign Application Priority Data

Apr. 16, 2007 (JP) .................................. 2007-107119
Jan. 28, 2008 (JP) .................................. 2008-016333

(51) Int. Cl.
*F28F 3/12* (2006.01)

(52) U.S. Cl.
USPC ........................................................ 165/168

(58) Field of Classification Search
USPC ........................................................ 165/168
See application file for complete search history.

(56) References Cited

U.S. PATENT DOCUMENTS 1,800,150 A * 4/1931 Musgrave et al. .............. 165/56
5,454,428 A * 10/1995 Pickard et al. .................. 165/49
(Continued)

FOREIGN PATENT DOCUMENTS

CN    1474487 A    2/2004
JP    52-76651 U    6/1977
(Continued)

OTHER PUBLICATIONS

International Preliminary Report on Patentability dated Oct. 29, 2009 (and English language translation thereof dated Nov. 19, 2009) issued in a counterpart International Application No. PCT/JP2008/057268. 12 pages.

(Continued)

*Primary Examiner* — Brandon M Rosati
(74) *Attorney, Agent, or Firm* — Holtz, Holtz, Goodman & Chick, PC

(57) ABSTRACT

A cooling/heating panel has a planar radiation panel (12), a metallic holding member (18) arranged partially on a backside of the radiation panel (12), and a resin heat exchange pipe (16) held by the holding member (18). The holding member (18) has: a flat soaking plate (20) which is superimposed on the radiation panel (12); and a holding portion (22) which is erected on the soaking plate (20) and latches the heat exchange pipe (16). The heat exchange pipe (16) has an outside diameter larger than an inside diameter of the holding portion (22) before the heat exchange pipe (16) is attached to the holding portion (22) and in a state in which the heat exchange pipe (16) is attached to the holding portion (22), the holding portion (22) holds a side face of the heat exchange pipe (16) repulsively from both sides.

10 Claims, 6 Drawing Sheets

(56) References Cited

U.S. PATENT DOCUMENTS

| | | | |
|---|---|---|---|
| 6,910,526 B1* | 6/2005 | Sokolean | 165/56 |
| 2004/0096683 A1 | 5/2004 | Ikeda et al. | |
| 2005/0028966 A1* | 2/2005 | Pickard | 165/168 |
| 2006/0198150 A1* | 9/2006 | Kinoshita et al. | 362/373 |

FOREIGN PATENT DOCUMENTS

| | | | |
|---|---|---|---|
| JP | 55-122087 U | 8/1980 | |
| JP | 57-93711 U | 6/1982 | |
| JP | 62-162827 A | 7/1987 | |
| JP | 3-127123 U | 12/1991 | |
| JP | 5-17407 U | 3/1993 | |
| JP | 06-193914 A | 7/1994 | |
| JP | 10-38293 A | 2/1998 | |
| JP | 10-227495 A | 8/1998 | |
| JP | 11-118167 A | 4/1999 | |
| JP | 11-166742 A | 6/1999 | |
| JP | 2000-121086 A | 4/2000 | |
| JP | 2002-130704 A | 5/2002 | |
| JP | 2003-231715 A | 8/2003 | |
| JP | 2005-233604 A | 9/2005 | |
| JP | 2006-170551 A | 6/2006 | |
| JP | 2007-021851 A | 2/2007 | |

OTHER PUBLICATIONS

Japanese Office Action dated Jun. 1, 2011 (and English translation thereof) in counterpart Japanese Application No. 2007-107119.
Japanese Office Action dated Nov. 2, 2011 (and English translation thereof) in counterpart Japanese Application No. 2007-107119.
Chinese Office Action dated Jan. 18, 2011 (and English translation thereof) in counterpart Chinese Application No. 200880012265.6.

* cited by examiner

COOLING/HEATING PANEL WITH HOLDING DEVICE

This application is a U.S. National Phase Application under 35 USC 371 of international Application PCT/JP2008/07268 filed Apr. 14, 2008.

TECHNICAL FIELD

The present invention relates to a cooling/heating panel which performs interior cooling or heating by means of radiation heat obtained by heat exchange via a fluid.

BACKGROUND ART

Conventionally, a radiation-type cooling/heating panel constructed on ceiling has been known. Such a cooling/heating panel has a radiation panel made of a metal or a plaster board; a metallic or resin heat exchange pipe is disposed at a backside of the radiation panel; and this cooling/heating panel is installed on a ceiling. A fluid of a predetermined temperature is flowed in the heat exchange pipe installed on the ceiling, and interior cooling/heating is performed.

As a ceiling cooling/heating panel having a metallic pipe, like a ceiling element disclosed in Patent Document 1, there is the one in which a metallic heat exchange pipe such as copper is mounted on a backside of a ceiling cooling/heating panel. The metallic heat exchange pipe per se has appropriate thermal conductivity; and has high gas barrier properties, so that oxygen does not permeate, or alternatively, circuit components or the like of a connecting portion do not corrode.

On the other hand, the resin heat exchange pipe has a feature that it is well workable, is lightweight, and is low in cost, whereas its thermal conductivity is low in comparison with that of the metallic heat exchange pipe. Therefore, like a ceiling radiation cooling/heating panel disclosed in Patent Document 2, there is proposed the one having a structure in which: a heat exchange pipe is covered with a metallic soaking plate and the heat exchange pipe is held between the soaking plate and a backside of a radiation panel. In this manner, a heat from the heat exchange pipe is efficiently transmitted to the radiation panel.

However, the resin heat exchange pipe has entailed a problem that: gas barrier properties are poor; oxygen contained in air enters a heat exchange medium passing through the heat exchange pipe; and circuit components of a heat exchange medium corrode. Further, a plurality of acoustic absorption holes are perforated and formed on the ceiling cooling/heating panel, and in case of fire, there is apprehension that: flames enter the backside of the radiation panel from the acoustic absorption holes; and the heat exchange pipe burns. Otherwise, there is a danger that: the pipe is melted by a heat; and the melted pipe leaks from the acoustic absorption holes of the radiation panel.

Therefore, like the ceiling radiation cooling/heating panel disclosed in Patent Document 3, there is proposed the one allowing a noninflammable sheet or a noninflammable plate material to be interposed between a radiation panel and a heat exchange panel, a respective one of which has acoustic absorption holes formed thereon.

Patent Document 1: Japanese Laid-open Patent Application No. 10-232035
Patent Document 2: Japanese Laid-open Patent Application No 2006-170551
Patent Document 3: Japanese Laid-open Patent Application No. 10-227495

DISCLOSURE OF THE INVENTION

Problem(s) to be Solved by the Invention

However, the above-described metallic heat exchange pipe as disclosed in Patent Document 1 of the prior art is large in mass; a load upon a ceiling material increases; a support member of the ceiling material increases and becomes heavy; and as a whole, the mass of a ceiling portion increases. As a result, a structure such as earthquake proof of buildings has been thereby affected. Moreover, a metallic heat exchange pipe is hardly processed in a meandering shape, and is easily plastically deformed. For example, if a metallic heat exchange pipe is attached to a pipe holding portion of a ceiling material, the pipe must be attached in a deformation quantity within an elastic limit in order for the pipe to be elastically deformed and repulsively intimately contacted, thus making it difficult to provide dimensional setting such that the pipe is hardly detached and can be elastically held. Therefore, elastic holding is realistically difficult, and the pipe cannot be mounted while a full surface is in intimate contact with the holding portion all over the full length of the heat exchange pipe. Further, between the heat exchange pipe at which the full surface is not in intimate contact therewith and its holding portion, thermal conduction is not good due to the presence of a spatial layer, resulting in a failure to exploit the virtue of thermal conduction of a metal.

In addition, like the abovementioned Patent Document 2, in the case of a structure in which a heat exchange pipe is held between metal plates, with the heat exchange pipe being precisely positioned on a radiation panel, a metallic soaking plate must be fixed so as to cover the radiation panel at a predetermined position, making assembling or construction difficult and increasing the number of man-hours. Therefore, a cooling/heating panel and cooling/heating equipment employing the panel has been prone to become high in cost.

Further, like the abovementioned Patent Document 3, in a case where a noninflammable sheet is provided between the heat exchange pipe and the radiation panel, since the noninflammable sheet uses a ceramic sheet or the like, its heat conductivity has been significantly lowered in comparison with that of a metal. Therefore, unlike a metal, a heat cannot be reliably efficiently transmitted, and thermal efficiency of the cooling/heating equipment has become lowered.

The present invention has been made in view of the above-described problem of the prior art, and aims to provide a cooling/heating panel which has high heat exchange efficiency, has a simple structure, is lightweight, and moreover, is easily assembled as well.

Means For Solving the Problem(s)

The present invention is directed to a cooling/heating panel, comprising:
a planar radiation panel;
a metallic holding member arranged partially on a backside of the radiation panel; and
a resin heat exchange pipe held on the holding member, wherein:
the holding member has a flat soaking plate and a holding portion formed thereon, the soaking plate being superimposed on the radiation panel, the holding portion being erected on the soaking plate and latching the heat exchange pipe;
an outside diameter of the heat exchange pipe is larger than an inside diameter of the holding portion before the pipe is attached to the holding portion; and the holding portion repulsively holds a side face of the heat exchange pipe from both sides in a state in which the heat exchange pipe is attached to the holding portion.

The radiation panel has a plurality of acoustic absorption holes which are perforated in a thickness direction; and a noninflammable sheet is laid out at a portion other than a site at which the soaking plate is provided.

The holding member is an elongated member mounted along a straight portion of the heat exchange pipe; and a cross-sectional shape of the holding member has a soaking plate and a semicircular curved portion integrally formed thereon, the soaking plate serving as a plate body superimposed on the radiation panel, the semicircular curved portion being erected from the soaking plate and opening upward.

The soaking plate is provided to ensure that: the holding portion is removed from the vicinity of an end of the soaking plate, being continuous to a straight portion of the heat exchange pipe that is curved and mounted on the holding member, reaching a curved portion, and facing the curved portion; and the curved heat exchange pipe can abut against the soaking plate.

An opening between the pair of curved portions is formed to be smaller than an inside diameter of the holding portion, formed by the curved portion, and is provided to elastically deform the heat exchange pipe and to be engagable into the holding portion.

The heat exchange pipe is a gas barrier tube; a layer positioned on an inner circumferential face is formed of polyurethane; a layer outside thereof is formed of an ethylene-vinyl alcohol copolymer: and a layer positioned at an outer circumferential face outside thereof is formed of polyurethane.

The heat exchange pipe is a gas barrier tube; a layer positioned on an inner circumferential face is formed of nylon; a layer outside thereof is formed polyurethane; a layer outside thereof is formed of an ethylene-vinyl alcohol copolymer; a layer positioned on an outer circumferential face outside thereof is formed of polyurethane.

Advantageous Effect(s) of the Invention

A cooling/heating panel of the present invention is adapted to easily mount a heat exchange pipe with a simple structure; thermal conduction between a metallic holding member and a resin heat exchange pipe is appropriate; and the metallic holding member is capable of reliably transmitting a temperature of a heat exchange fluid of the heat exchange pipe to a radiation panel. In this manner, the cooling/heating panel can be formed having high thermal exchange efficiency between the fluid flowing in the heat exchange pipe and the radiation panel and high energy efficiency.

In addition, in the case of comparison with a conventional metallic heat exchange pipe, a mass of the cooling/heating panel can be reduced, and considering the entire buildings, a reduction effect of the mass of the cooling/heating panel is significantly great. Further, the metallic heat exchange pipe is easily plastically deformable, and it is difficult to attach the pipe to the holding member so as to be repulsively in intimate contact therewith; and however, with a structure of the present invention, appropriate thermal conduction is obtained even in the resin heat exchange pipe.

In addition, a noninflammable sheet is provided at a portion other than a receptacle-mounted portion on the backside of the radiation panel, and even if a resin is used for the heat exchange pipe, noninflammable properties can be reliably obtained.

Further, the cooling/heating panel of the present invention is lightweight and has high thermal exchange efficiency, and is capable of restraining oxidization of connecting components.

EXPLANATION OF REFERENCE NUMERALS

Figure 1:
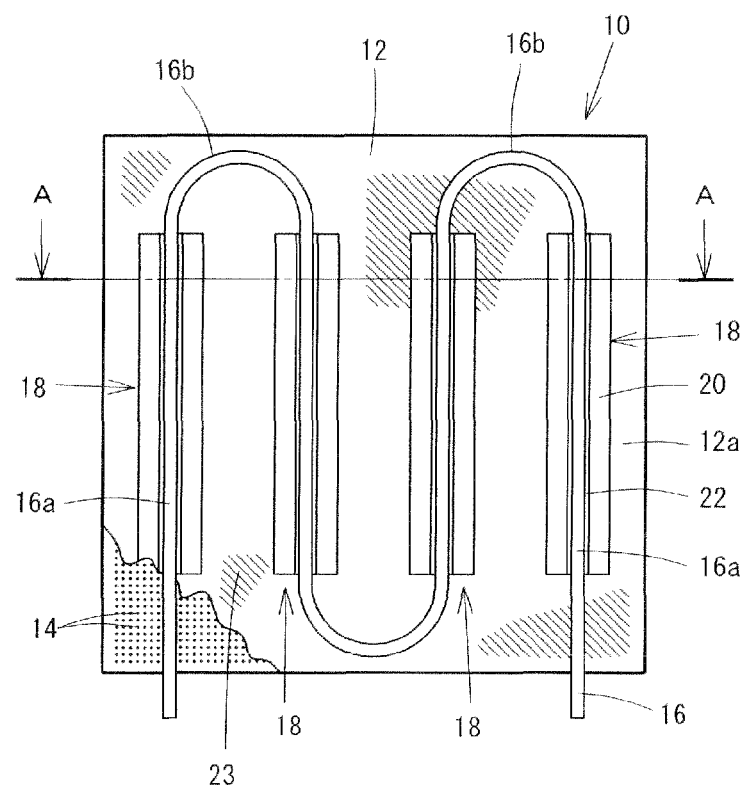
FIG. 1 It is a front view of a cooling/heating panel of a first embodiment of the present invention.

10 Ceiling-mounted cooling/heating panel
12 Radiation panel
14 Acoustic absorption hole
16 Heat exchange pipe
16a Straight portion
16b Curved portion
18 Holding member
20 Soaking plate
22 Holding portion
22a Curved portion
22b Wing portion
23 Noninflammable sheet

BEST MODE FOR CARRYING OUT THE INVENTION

Hereinafter, embodiments of the present invention will be described referring to the drawings. FIGS. 1 to 5 show a first embodiment of the present invention, and a cooling/heating panel of the embodiment is a ceiling-mounted cooling/heating panel 10, and is provided with a planar radiation panel 12. The radiation panel 12 is molded with: a metal plate formed of aluminum or iron; a plaster board; or concrete, and a plurality of acoustic absorption holes 14 are perforated and formed. On a backside 12a of the radiation panel 12, a heat exchange pipe 16 is provided to be held by means of a holding member 18 as described later. In the heat exchange pipe 16, straight portions 16a crossing a unidirectional width of the radiation panel 12 and curved portions 16b returning while they are curved before reaching an end part of the radiation panel 12 are alternately formed, and consecutively meander.

Figure 2:
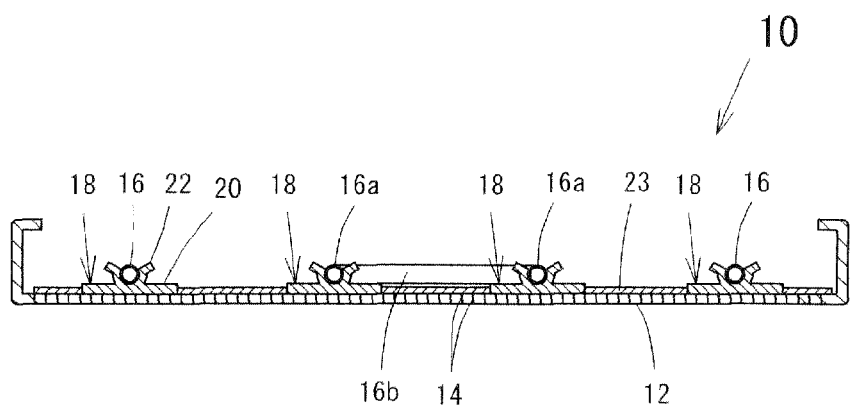
FIG. 2 It is a sectional view taken along the line A-A of FIG. 1.
Figure 3:
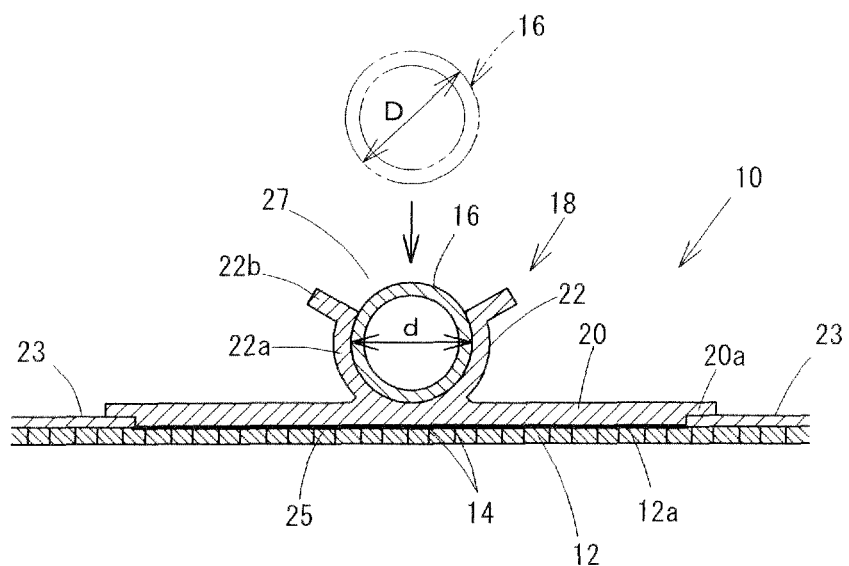
FIG. 3 It is an enlarged sectional view taken along the line A-A.

On the backside 12a of the radiation panel 12, as shown in FIGS. 1 to 3, the holding members 18 for holding the straight portions 16a of the heat exchange pipe 16 are mounted. The holding members 18 are formed of a metal such as an aluminum-extruded material; are elongated members mounted along the straight portions 16a of the heat exchange pipe 16; and are uniform in a cross-sectional shape of a longitudinal direction. A cross-sectional shape of the holding member 18, as shown in FIG. 3, is provided with a soaking plate 20 which is superimposed on the backside 12a of the radiation panel 12, and a holding portion 22 for holding the heat exchange pipe 16 is provided at a center of the soaking plate 20. A semicircular curved portion 22a, which is erected from the soaking plate 20 and opens upward, is formed at a tip end of the curved portion 22a; and an inside diameter d of the curved portion 22a is slightly smaller than an outside diameter D of the heat exchange pipe 16 at normal temperature and is formed; an inner circumferential face of the curved portion 22a comes into intimate contact with an outer circumferential face of the heat exchange pipe 16; and a side face of the heat exchange pipe 16 is repulsively held between both sides. In addition, an opening 27 between a pair of the curved portions 22a is formed to be slightly smaller than the inside diameter d of the holding member 18, exerted by the curved portion 22a; and the heat exchange pipe 16 is provided to be elastically deformed by receiving it by the wing portion 22b and engagable between the curved portions 22a.

Primer treatment for the sake of ensuring adhesiveness is applied to the backside 12a of the radiation panel 12 on which the holding member 18 is to be mounted; and the backside 12a is bonded with a hot melt adhesive 25 formed of a thermally plastic resin, for example. The backside of the holding member 18 is black-coated so as to be hardly visible via the acoustic absorption hole 14 from a top side of the radiation panel 12.

Figure 4:
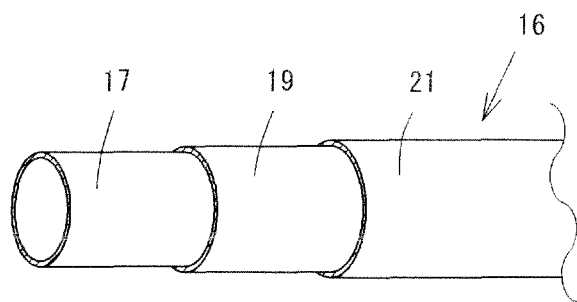
FIG. 4 It is a partially fragmental perspective view of a heat exchange pipe of the cooling/heating panel of the embodiment.

The heat exchange pipe 16, as shown in FIG. 4, is a tube with gas barrier properties, structured to be three-layered; a first layer 17 positioned on an inner circumferential face is formed of polyurethane; a second layer 19 outside of the first layer is formed of an ethylene-vinyl alcohol copolymer (hereinafter, referred to as EVOH); and a third layer 21 positioned on an outer circumferential face outside of the second layer is formed of polyurethane. The EVOH has high gas barrier properties, and precludes oxygen contained in air from dissolving into a heat exchange fluid passing through the heat exchange pipe 16. Since polyurethane is soft and is easily deformable, even if the EVOH is provided in the second layer 19, the pipe is easily inserted into the holding portion 22 of the holding member 18. Further, polyurethane has rebound resilience, so that an outside diameter returns to its original position after the pipe has been inserted into the holding portion 22; the pipe is reliably held in intimate contact with an interior face of the holding portion 22; and thermal conduction becomes appropriate.

Next, a method of mounting the heat exchange pipe 16 on the holding member 18 will be described. The heat exchange pipe 16 is pressed between a pair of wing portions 22b; and the curved portion 22a and the heat exchange pipe 16 are elastically deformed, are pushed and elastically latched between the curved portions 22a. At this time, a jig used exclusively for pushing the heat exchange pipe 16 into the curved portion 22a of the holding member 18 may be employed.

On the backside 12a of the radiation panel 12, a noninflammable sheet 23 is laid out. The noninflammable sheet 23 is a ceramic sheet or a glass wool sheet, for example, or other noninflammable sheet-like material. The noninflammable sheet 23, as shown in FIG. 3, is inserted into a cutout portion 20a formed on a backside of a bilateral rim part of the soaking plate 20 of the holding member 18, and the rim parts are thereby held. As shown in FIG. 3, the noninflammable sheet thereby includes a first portion that is inserted into the cutout portion 20a and a second portion not covered by the bilateral rim part of the soaking plate 20 and laid out at a portion other than a site at which the soaking plate is provided.

Figure 5:
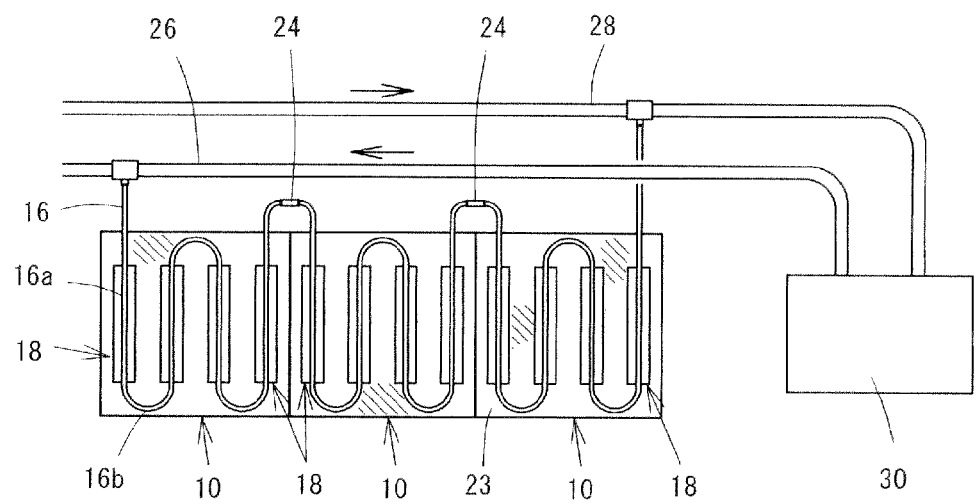
FIG. 5 It is a schematic view showing a method of using the cooling/heating panel of the embodiment.

Next, a method of using the ceiling-mounted cooling/heating panel 10 will be described referring to FIG. 5. The ceiling-mounted cooling/heating panels 10 are arranged and mounted on an interior ceiling so that the backside 12a of the radiation panel 12 is at a loft side. Afterwards, ends of the heat exchange pipe 16 are connected to each other by means of a connecting member 24. One end of the heat exchange pipe 16 with the plurality of ceiling-mounted cooling/heating panels 10 being connected thereto is connected to a supply-side main pipe 26, and the other end of the pipe is connected to a return-side main pipe 28. The supply-side main pipe 26 and the return-side main pipe 28 are connected to a heat source 30 such as a water heater.

The heat source 30 supplies a heat exchange fluid of a desired temperature to the heat exchange pipe 16 of the ceiling-mounted cooling/heating panel 10. The heat exchange fluid is water, for example. The water of a predetermined temperature that was supplied from the heat source 30 to the supply-side main pipe 26 is supplied from one end of the heat exchange pipe 16. The supplied water passes through the plurality of heat exchange pipes 16 connected via the connecting member 24, and is then heat-exchanged: and the heat-exchanged water flows from the other end to the return-side main pipe 28, and further, returns to the heat source 30. In a course in which water passes through the heat exchange pipe 16, heat exchange is performed with the radiation panel 12 via the holding member 18. At the heat source 30, water is adjusted again at a desired temperature, and is supplied to a supply-side main pipe 26.

The ceiling-mounted cooling/heating panel 10 of the embodiment has its simple structure and is capable of reliably performing heat exchange. The holding member 18 is formed of a metal with high thermal conductivity, so that: heat exchange is performed via the holding member 18 between the heat exchange pipe 16 and the radiation panel 12; and thermal efficiency is appropriate. Further, an outside diameter D of the heat exchange pipe 16 becomes slightly larger than an inside diameter d of the holding member 18 at normal temperature; an outer circumferential face of the heat exchange pipe 16 reliably comes into intimate contact with an interior face of the holding member 18; and thermal conduction is appropriately performed. In particular, in a case where cool water is flown into the heat exchange pipe 16 at the time of cooling, the heat exchange pipe 16 becomes lower in temperature than the holding member 18, and shrinks more significantly than the holding member 18. However, at normal temperature, the outside diameter D of the heat exchange pipe 16 is slightly larger than the inside diameter d of the holding member 18, so that: the heat exchange pipe 16 reliably comes into intimate contact with the interior face of the holding member 18; and thermal conduction is appropriately performed. In addition, if hot water is passed through the heat exchange pipe 16, the diameter of the heat exchange pipe 16 becomes slightly larger at a temperature and pressure of the water, and the heat exchange pipe 16 comes into intimate contact with the curved portion 22a of the holding member 18 more strongly. In this manner, heat exchange efficiency between the heat exchange pipe 16 and the holding member 18 can be appropriately obtained.

Further, the heat exchange pipe 16 is structured to be three-layered; the first layer 17 and the third layer 21 are formed of polyurethane, are flexible, and are easily workable; and the second layer 19 is formed of the EVOH with high gas barrier properties, and precludes the oxygen contained in air from dissolving into circulating water. Since oxygen does not dissolve in water, even if a connecting member 24 or the like is formed of a metal, the connecting member does not corrode, allowing its durability to be maintained.

The heat exchange pipe 16 is mounted and held by means of an elastic force exerted by holding the pipe with the holding portion 22 of the holding member 18, thus eliminating a specific latching device and simplifying its structure. In addition, the heat exchange pipe 16 is easily mountable or removable. The pipe can be mounted by a simple operation of merely pressing it between wing portions 22b of the holding portion 22; is guided to the wing portions 22b of the holding portion 22; and can be simply pushed into the curved portion 22a. The pipe is guided into the wing portion 22b, whereby, even if an excessive force is applied to the heating portion 22, the pipe is never broken and is safe.

In addition, in the case of comparison with the conventional heat exchange pipe formed of a metal such as copper, a mass of the ceiling-mounted cooling/heating panel 10 can be reduced by the order of 10%; and as to buildings in which the ceiling-mounted cooling/heating panels 10 are employed, the reduction effect of the mass of the cooling/heating panel 10 greatly influences earthquake proof properties or the like.

Further, the metallic heat exchange pipe is easily plastically deformed, and, for example, in a case where the pipe is attached to the holding member 18, the pipe must be held by a deformation quantity within an elastic limit when the pipe is elastically deformed and is repulsively brought into contact with somewhere, and its dimensional setting becomes difficult. Therefore, when the pipe is attached to the holding member 18, the pipe is easily plastically deformed, and in the case of a metallic heat exchange pipe, unlike the embodiment, the heat exchange pipe cannot be elastically brought into intimate contact with the curved portion 22a all over a full length.

Moreover, on the ceiling-mounted cooling/heating panel 10, a portion other than a receptacle 18 of the radiation panel 12 is covered with the noninflammable sheet 23, thus improving noninflammable properties, which precludes the heat exchange pipe 16 from burning in case of fire. Even if an inexpensive synthetic resin is used for the heat exchange pipe 16, it is possible to obtain accreditation of noninflammable properties.

Figure 6:
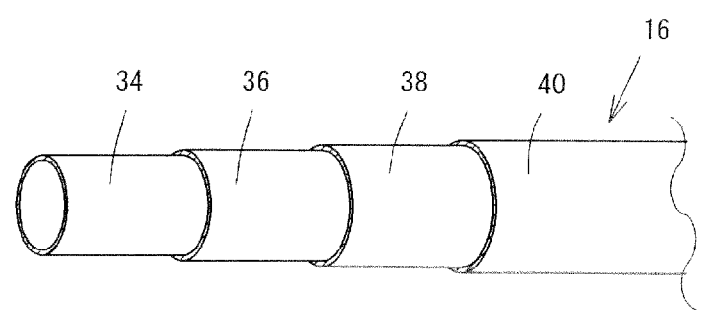
FIG. 6 It is a partially fragmental perspective view showing a modified example of the heat exchange pipe of the cooling/heating panel of the embodiment.

The heat exchange pipe 16 may be structured to be four-layered, as shown in FIG. 6, apart from being structured in three-layered. In a gas barrier tube of the heat exchange pipe 32 shown in FIG. 6, a first layer 34 positioned on an inner circumferential face is formed of nylon, and a second layer 36 outside of the first layer is formed of polyurethane. In addition, a third layer outside of the second layer is formed of the EVOH, and a fourth layer 40 positioned on an outer circumferential face outside of the third layer is formed of polyurethane. Nylon of the first layer 34 is strong to water, thus making it possible to enhance durability of the heat exchange pipe 16 or the like. Further, nylon can be laminated outside of the gas barrier tube, or alternatively, a publicly known resin other than nylon can also be laminated.

Figure 7:
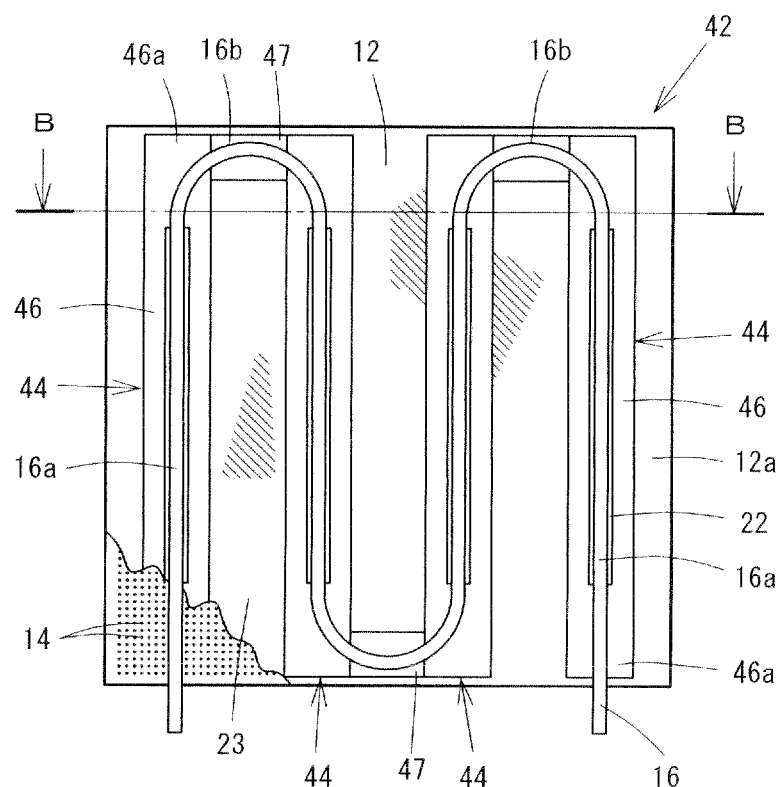
FIG. 7 It is a front view of a cooling/heating panel of a second embodiment of the present invention.
Figure 8:
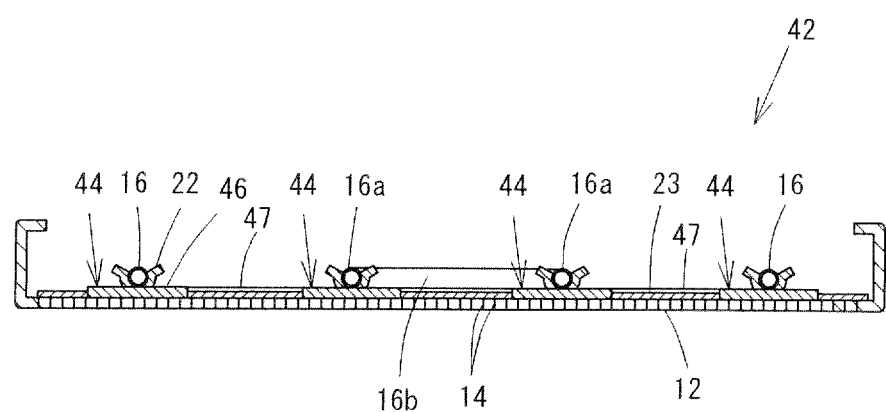
FIG. 8 It is a sectional view taken along the line B-B of FIG. 7.
Figure 9:
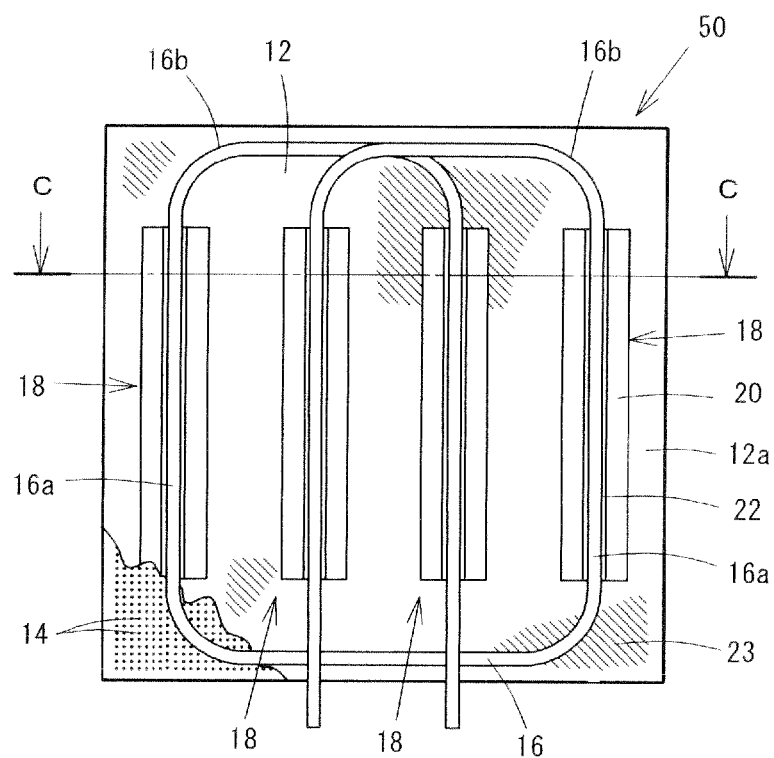
FIG. 9 It is a front view of a cooling/heating panel of a third embodiment of the present invention.
Figure 10:
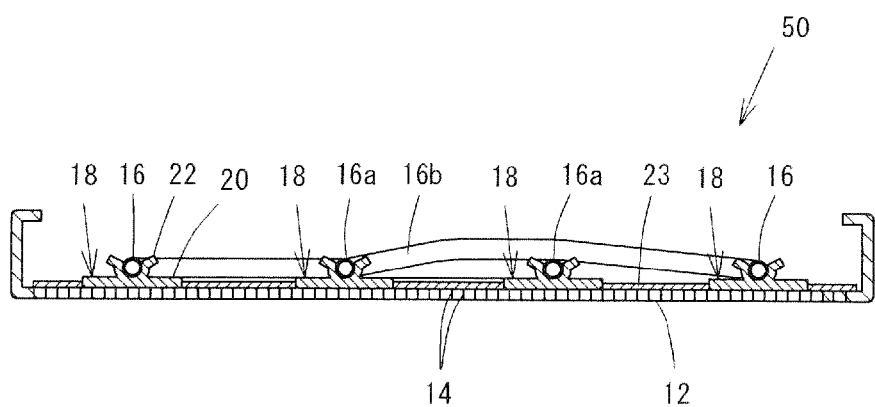
FIG. 10 It is an enlarged sectional view taken along the line C-C of FIG. 9.
Figure 11:
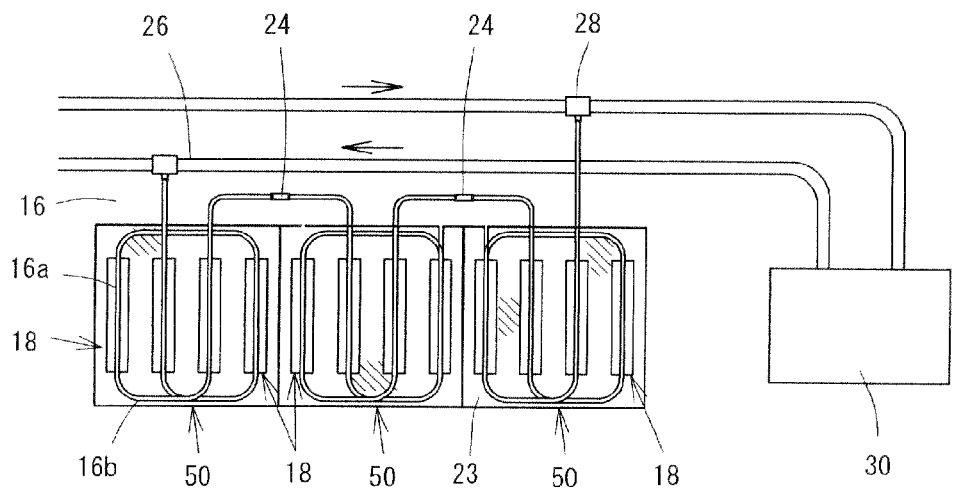
FIG. 11 It is a schematic view showing a method of using the cooling/heating panel of the third embodiment.

Next, a second embodiment of the present invention will be described referring to FIGS. 7 and 8. Hereinafter, like constituent elements in the above-described embodiment are designated by like reference numerals and a duplicate description is omitted. In a ceiling-mounted cooling/heating panel 42 of the embodiment as well, holding members 44 for holding the straight portions 16a of the heat exchange pipe 16 are mounted on the backside 12a of the radiation panel 12. The holding members 44 are formed of a metal such as an aluminum-extruded material; are elongated members mounted along the straight portions 16a of the heat exchange pipe 16; and are uniform in the cross-sectional shape of a longitudinal direction. Soaking plates 46, which are plate bodies superimposed on the backside 12a of the radiation panel 12, are provided at the holding members 44, and holding portions 22 are provided at the cores of the soaking plates 46. The holding members 44 are mounted from end to end of the radiation panel 12, reinforcing the radiation panel 12 and precluding slackness.

The holding portions 22 are provided only at portions at which the straight portions 16a of the heat exchange pipe 16, of the soaking plate 46, are positioned, and hold the straight portions 16a. Ends 46a in the longitudinal direction of the soaking plates 46 come into contact with curved portions 16b that are continuous relative to the straight portions 16a of the heat exchange pipe 16. Further, between the ends 46a in the longitudinal direction of the soaking plates 46 on which the curved portions 16b are positioned, soaking plates 47 are attached to the backside of the radiation panel 12. Moreover, the holding portions 22 are removed from the vicinity of the ends 46a of the soaking plates 46 coming into contact with the curved portions 16b. Therefore, the curved portions 16b are merely placed on the soaking plates 46, 47.

The holding portions 22 may be removed only at the side at which the curved portions 16b of the heat exchange pipe 16 is curved, and in this case also, advantageous effect similar to the aforementioned one is attained. The curved portions 16b may connect to the holding portions 22 of the adjacent soaking plates 46 so as to climb over without removing the holding portions 22. In this case, the number of man-hours of the holding portions 22 can be reduced.

The ceiling-mounted cooling/heating panel 42 of the embodiment has a similar advantageous effect by the use method similar to the abovementioned embodiment. The soaking plates 46, 47 are positioned between the curved portion 16b of the heat exchange pipe 16 and the radiation panel 12, thus improving thermal efficiency more remarkably. In addition, even if the radiation panel 12 is large, the panel is reinforced by the holding members 44, precluding slackness and improving appearance as well.

Next, a third embodiment of the present invention will be described referring to FIGS. 9 to 12. Hereinafter, like constituent elements of the above-described embodiments are designated by like reference numerals and a duplicate description is omitted. In a ceiling-mounted cooling/heating panel 50 of the embodiment as well, the holding members 18 for holding the straight portions 16a of the heat exchange pipe 16 are mounted on the backside 12a of the radiation panel 12.

The heat exchange pipe 16 of the embodiment is mounted on the holding portion 22 while the pipe is curved at every interval in the same direction relative to the holding member 18 fixed to the radiation panel 12.

The ceiling-mounted cool panel 50 of the embodiment also has a similar advantageous effect by the use method similar to that of the above-described embodiments, and a curving direction of the heat exchange pipe 16 is uniform, so that the heat exchange pipe 16 is curved in the direction of the winding habit of the heat exchange pipe 16, allowing setting of the curved portions 16b to be provided more easily.

Figure 12:
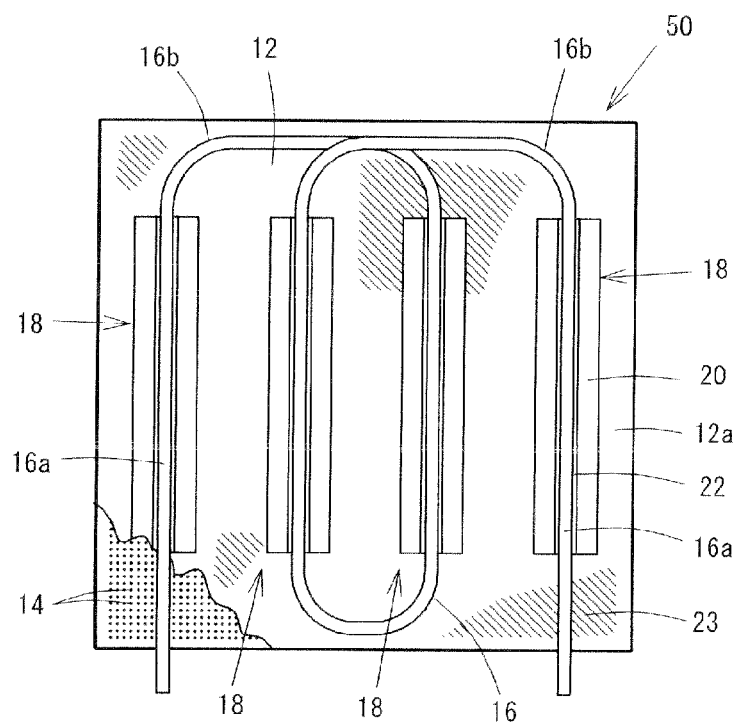
FIG. 12 It is a front view showing a modified example of layout of a heat exchange pipe of the third embodiment.

Similarly, as shown in FIG. 12, both ends of the heat exchange pipe 16 may be brought to both sides of the radiation panel 12. In this case also, advantageous effect similar to that of the above-described embodiments can be attained.

The cooling/heating panel of the present invention is not limitative to each of the above-described embodiments, the layout or shape of a heat exchange pipe can be appropriately set, and the layout and meandering or curving counts of the heat exchange pipe can also be appropriately changed. The shape or size of the radiation panel and gaps of acoustic absorption holes or the like can also be appropriately selected. A material for, or thickness of, a radiation panel or a noninflammable sheet can also be appropriately selected, and the heating/cooling panel is applicable to an appropriate location such as a wall other than a ceiling. In addition, in the heat exchange pipe, a process such as aluminum vapor deposition may be performed for an outer circumferential face in order to enhance gas barrier properties.

The invention claimed is:

1. A cooling/heating panel, comprising:
a planar radiation panel;
a metallic holding member arranged partially on a backside of the radiation panel; and
a resin heat exchange pipe held on the holding member, wherein:
the holding member has a flat soaking plate and a holding portion formed thereon, wherein the soaking plate is superimposed on the radiation panel, and the holding portion is erected on the soaking plate and latches the heat exchange pipe;
an outside diameter of the heat exchange pipe is larger than an inside diameter of the holding portion before the pipe is attached to the holding portion;
the holding portion repulsively holds a side face of the heat exchange pipe from both sides in a state in which the heat exchange pipe is attached to the holding portion;
the radiation panel is perforated in a thickness direction to form a plurality of acoustic absorption holes;
the holding member is an elongated member mounted along a straight portion of the heat exchange pipe;
with respect to a cross-sectional shape of the holding member, the soaking plate has a semicircular curved portion of the holding portion formed integrally thereon, wherein the soaking plate serves as a plate body superimposed on the radiation panel, and the semicircular curved portion is erected from the soaking plate and opens upward;
a backside of the soaking plate of the holding member is black-coated; and
the radiation panel comprises a noninflammable sheet which includes (i) a first portion that is inserted into a cutout portion formed on a backside of a bilateral rim part of the soaking plate of the holding member so that the noninflammable sheet is held by the soaking plate, and (ii) a second portion not covered by the bilateral rim part of the soaking plate and laid out at a portion other than a site at which the soaking plate is provided.

2. The cooling/heating panel according to claim 1, wherein the holding portion is provided along the straight portion of the heat exchange pipe, and the holding portion is removed from a vicinity of an end of the soaking plate where the heat exchange pipe is curved; and
wherein the soaking plate is provided such that a curved portion of the heat exchange pipe abuts against the soaking plate.

3. The cooling/heating panel according to claim 1, wherein an opening between a pair of curved portions of the semicircular curved portion of the holding portion is formed to be smaller than the inside diameter of the holding portion which is formed by the pair of curved portions, wherein the opening of the holding portion elastically deforms the heat exchange pipe when the pipe is engaged with the holding portion.

4. The cooling/heating panel according to claim 1, wherein the heat exchange pipe is a gas barrier tube comprising:
a first polyurethane layer positioned on an inner circumferential side of the gas barrier tube;
an ethylene-vinyl alcohol copolymer layer positioned at an outer circumferential side of the first polyurethane layer; and
a second polyurethane layer positioned at an outer circumferential side of the ethylene-vinyl alcohol copolymer layer.

5. The cooling/heating panel according to claim 1, wherein the heat exchange pipe is a gas barrier tube comprising:
a nylon layer positioned on an inner circumferential side of the gas barrier tube;
a first polyurethane layer at an outer circumferential side of the nylon layer;
an ethylene-vinyl alcohol copolymer layer at an outer circumferential side of the first polyurethane layer; and
a second polyurethane layer an outer circumferential side of the ethylene-vinyl alcohol copolymer layer.

6. The cooling/heating panel according to claim 1, further comprising a plurality of holding members, wherein the heat exchange pipe is held onto the plurality of holding members in a serpentine manner such that the heat exchange pipe has a plurality of straight portions which are respectively held by a plurality of holding portions of the plurality of holding members and the heat exchange pipe has a plurality of curved portions which are in-between the plurality of straight portions held by the plurality of holding members.

7. The cooling/heating panel according to claim 6, wherein the holding portions are not provided at positions corresponding to the plurality of curved portions of the heat exchange pipe, and further comprising a plurality of horizontal soaking plates which are provided in-between the plurality of holding members such that the plurality of curved portions of the heat exchange pipe abut against the plurality of horizontal soaking plates and against longitudinal end portions of a plurality of soaking plates of the plurality of holding members.

8. The cooling/heating panel according to claim 3, wherein the semicircular curved portion of the holding portion has a pair of wing portions which guide the heat exchange pipe toward the opening between the pair of curved portions of the holding portion so that the heat exchange pipe is latched by the holding portion.

9. The cooling/heating panel according to claim 1, further comprising a plurality of holding members, wherein the heat exchange pipe is held onto the plurality of holding members such that a curvature direction in which the pipe is curved at each interval relative to a holding member is the same as a curvature direction of a winding habit of the heat exchange pipe before the heat exchange pipe is attached to the plurality of holding members.

10. The cooling/heating panel according to claim 1, wherein the cooling/heating panel is a ceiling-mounted cooling/heating panel.

* * * * *

UNITED STATES PATENT AND TRADEMARK OFFICE
CERTIFICATE OF CORRECTION

PATENT NO. : 8,561,677 B2
APPLICATION NO. : 12/595854
DATED : October 22, 2013
INVENTOR(S) : Masashi Miyamura Page 1 of 1

It is certified that error appears in the above-identified patent and that said Letters Patent is hereby corrected as shown below:

In the Claims

Column 10, Line 26 (Claim 5, Line 9):

delete "an" and insert --at an--.

Signed and Sealed this
Twenty-second Day of April, 2014

Michelle K. Lee
*Deputy Director of the United States Patent and Trademark Office*